United States Patent
Maslar

(10) Patent No.: US 12,213,620 B1
(45) Date of Patent: Feb. 4, 2025

(54) ANODIZING AND SEASONING PROCESS FOR COOKING SURFACES

(71) Applicant: David Maslar, Gambrills, MD (US)

(72) Inventor: David Maslar, Gambrills, MD (US)

(*) Notice: Subject to any disclaimer, the term of this patent is extended or adjusted under 35 U.S.C. 154(b) by 714 days.

(21) Appl. No.: 17/165,909

(22) Filed: Feb. 2, 2021

Related U.S. Application Data

(60) Provisional application No. 62/969,186, filed on Feb. 3, 2020.

(51) Int. Cl.
*A47J 36/02* (2006.01)
*B05D 5/08* (2006.01)
*C22C 21/00* (2006.01)
*C25D 11/18* (2006.01)

(52) U.S. Cl.
CPC .............. *A47J 36/025* (2013.01); *B05D 5/08* (2013.01); *C22C 21/00* (2013.01); *C25D 11/18* (2013.01)

(58) Field of Classification Search
CPC .......... A47J 36/025; B05D 5/08; C22C 21/00; C25D 11/18
See application file for complete search history.

(56) References Cited

U.S. PATENT DOCUMENTS

| | | | |
|---|---|---|---|
| 2007/0080068 A1* | 4/2007 | Ferralli | C25D 11/243 205/221 |
| 2020/0015486 A1* | 1/2020 | Huang | A21B 5/02 |
| 2020/0146270 A1* | 5/2020 | Calis | A01K 67/033 |
| 2021/0047523 A1* | 2/2021 | Dustin | C08G 18/10 |
| 2021/0071276 A1* | 3/2021 | Henry | C21D 1/58 |
| 2021/0138548 A1* | 5/2021 | Liu | B22F 9/06 |
| 2021/0244228 A1* | 8/2021 | Dash | A47J 37/0611 |

* cited by examiner

*Primary Examiner* — Michael G Miller
(74) *Attorney, Agent, or Firm* — Tangent Law Group, PLLC; Eric J. Weierstall, esq.

(57) ABSTRACT

The invention is includes a cooking surface having an aluminum or aluminum alloy substrate that is hard anodized which is not sealed during an anodizing process and is then coated with seasoning oil such that the seasoning oil first penetrates the open anodized pores and is adhered therein. The base polymerization oil is held within the microscopic pores in the substrate and cured in situ. The process bonds the oil to the surface creating a non-stick cooking surface. In instances where worn spots develop between the pores on the surface, the surface can be refreshed with a simple recoating linking the pores that retain the original layer, maintaining the non-stick surface. The method provides for the process of curing the oil and polymerizing the oil within the pores before any sealing occurs on the aluminum/aluminum oxide substrate.

18 Claims, 2 Drawing Sheets

ANODIZING AND SEASONING PROCESS FOR COOKING SURFACES

CROSS-REFERENCE TO RELATED APPLICATIONS

This application claims the priority of U.S. provisional patent application 62/969,186, filed Feb. 3, 2020, which is incorporated herein by reference.

FIELD OF THE INVENTION

The invention is directed to a method of manufacturing an aluminum based seasoned cooking surface that provides the non-toxic and user renewable benefits of a seasoned cooking surface with the superior thermal and corrosion resistant properties of an aluminum substrate and articles of manufacture using this method.

BACKGROUND OF THE INVENTION

Non-Stick cooking surfaces are common in all manner of food preparation. Over the years these surfaces or coatings have evolved from Teflon based coatings to a myriad of other non-stick treatments and coating that are applied to virtually every type of surface that may come into contact with food items. These non-stick surfaces have several significant limitations which have revealed themselves over their many years of development.

One factor is the inevitable wear and resultant degradation of non-stick performance. These surfaces, especially those exposed to cooking temperatures, inevitably begin to lose their non-stick qualities over time, and this loss tends to be progressive with additional use. As a result the pans and accessories have finite life spans and ultimately require replacement as there is no potential for end user maintenance or repair of the non-stock treatment or coatings.

This limited lifespan also leads product manufacturers to tend toward producing less expensive products as they are sensitive to consumer awareness of the limited lifespan and disposability of these non-stick products. Lower cost of cooking related products is typically achieved through the use of lower mass and thickness and lower quality materials in the product manufacture. These cost saving measures produce cookware and appliance components that ultimately provide poor performance due to the thermal limitations and poor geometric stability, which leads to warping or other product distortion, associated with thinner and less expensive materials as well as lower cost production processes. In summary, low cost non-stick cookware performs poorly in virtually every category of evaluation related to actual use.

A second consideration is the growing public awareness of the existence of toxic properties of these non-stick coatings. Perhaps the first non-stick coating, Teflon, is widely known to release toxic gasses during use, so much so that they can be fatal to birds located within the cooking environment. The public is becoming increasingly aware of this reality and product manufacturers have responded by introducing new PTFE (polytetrafluoroethylene or Teflon) and PFOA (perfluorooctanoic acid) free formulations that are widely claimed to be ceramic or non-toxic. Although these claims are widely used by manufacturers, there is growing evidence that the majority if not all of these coating systems contain chemicals with unknown toxicity and the potential for adverse health effect in the long term. One potential source of these toxins is the primer or binder layers that must be applied to the cooking substrate to augment adhesion of the non-stick top layer. Regardless of the toxicity of any individual formulation a percentage of the public is seeking non-toxic alternatives to these non-stick coatings.

Thus desire for a safe alternative non-stick cooking surface has led to a reemergence in popularity of traditional "seasoned" cooking surfaces. A seasoned cooking surface is a substrate, typically cast iron, which has been coated with a cooking oil that has subsequently, sometimes thought actual use and sometimes through a specific heating process, been polymerized into a tough naturally stick-resistant film. This polymerized oil film or seasoning is not only far less likely to stick to food while cooking but also serves to protect the substrate from environmental elements which may include acids or water which may cause oxidation or rust and damage the substrate. A seasoned cooking surface is considerably better then bare metals at resisting food sticking.

A major limitation of the seasoned pan lies in the limitations of suitable substrate material that can be used to manufacture cookware. The original seasoned surface was typically cast iron. The porous surface allowed some degree of absorption of the cooking oils that could develop functional adhesion when polymerized. This surface could withstand the temperatures and abrasion of cooking for some amount of use while still maintaining elevated stick resistance when compared to bare metals. Carbon steels have also been known to "season" with success but tend to exhibit lower adhesion. Stainless steels have been shown to resist the adhesion of a seasoned polymer coating and are not a functional substrate for a seasoned coating. Thus, the two functional choices for a seasoned coating, cast iron (including to a lesser degree wrought iron) and carbon steel both have major limitations in material properties that limit their effectiveness as cooking substrates.

One such limitation is their thermal conductivity. They are poor when compared to other commonly used cooking substrates like copper and aluminum. A second is their weight which is substantially greater then aluminum. And a third is their poor resistance to environmental sources of corrosion, namely their ability to rust with exposure to water and to be attacked by acids commonly present in foods like tomatoes, vinegar and wine. All of these characteristics limit the desirability and performance of seasoned pans, and typically require the user to maintain these pans with a strict regimen of precautions during use and specific cleaning requirements to prevent subsequent damage to the pans and maintain a usable seasoned cooking surface.

There exists a need for a superior performing cooking substrate that can accommodate a seasoned cooking surface. Such a substrate would be an alternative to traditional seasoned pans with higher thermal conductivity, better reception and adhesion of the seasoning material and a process which is reasonably cost competitive. The resulting pan would have a longer usable life and be able to be refreshed by the end user.

SUMMARY OF THE INVENTION

An object of the invention is an improved anodized and seasoned cooking surface or an improved anodized surface with a seasoning pre-treatment ready for final seasoning and maintenance by an end-user.

An object of the invention is to provide a stick resistant cooking surface that can be restored or renewed by the end user and also is impervious to rust or degradation caused by common cooking ingredients like water or acidic foods.

Another object of the invention is to provide a stick resistant cooking surface that can be restored or renewed by the end user and has superior thermal properties to steel or cast iron as a substrate material.

Yet another object of the invention is to provide a cooking surface with anodized heat treating with pore sizes sufficient to retain a seasoning oil as a non-stick or stick resistant surface that can be refreshed over time by an end-user and provides improved performance over existing non-stick and stick resistant surfaces on both aluminum and other media.

The invention includes a method, an apparatus, and an article of manufacture for an improved anodized and seasoned cooking surface and pan.

The apparatus of the instant invention includes a cooking surface comprised of an aluminum or aluminum alloy substrate that is hard anodized which is not sealed during an anodizing process and is then coated with seasoning oil such that the seasoning oil first penetrates the open anodized pores and is adhered therein. The surface can be further baked at a temperature and for a time needed to begin polymerization or to fully polymerize the seasoning oil. The seasoning oil can be a drying oil with an iodine value greater than 130. The seasoning oil can be a semi-drying oil with an iodine value of between about 115 to 130. The seasoning oil can be a non-drying oil with an iodine value less than 115. The seasoning oil can be for example at least one of grape seed oil, flax seed oil, corn oil, canola oil, sunflower oil, olive oil and peanut oil.

The article of manufacture of the instant invention comprises an unsealed anodized aluminum or aluminum alloy food preparation article substrate which has a porous surface with a plurality of pores, the substrate being treated in treatment process whereby the substrate is prepared for food preparation with the plurality of pores being filled with a seasoning oil and the oil in the plurality of pores in the surface is further processed through a polymerization process into a stick resistant cooking surface.

The method of the invention includes a method of forming an adhered layer of polymerized seasoning oil on a non-stick anodized aluminum or aluminum alloy pan such that the polymerized oil is retained within the porous substrate of the pan, comprising the steps of anodizing an aluminum pan surface to produce an open porous, unsealed anodized pan surface; preparing the anodized pan surface to receive a polymerizing seasoning oil within the open pores of the open porous, unsealed anodized pan surface; applying a polymerizing seasoning oil to the anodized aluminum pan surface such that it penetrates the open pores of the open porous, unsealed anodized pan surface; and heating the anodized aluminum pan surface so as to polymerize the seasoning oil and bond the polymerizing seasoning oil into the pores and retaining the seasoning oil therein to form a non-stick cooking surface.

The method can further comprise an at least one additional layer of seasoning oil and a further step of heating to polymerize the oil and bond the at least one additional layer of seasoning oil to the non-stick cooking surface. The open porous, unsealed anodized pan surface can include a substrate of aluminum oxide having a plurality of pores substantially uniformly distributed thereon and which draws the seasoning oil into the plurality of pores through a capillary action in the application step. The method can further comprise the step of affixing a handle to the anodized pan surface. The method can further comprise the method step of sealing the anodized aluminum pan surface. The method step of preparing the anodized aluminum pan surface can further comprise the method step of bathing the anodized aluminum pan surface in a liquid bath. The m the liquid bath can further comprise a least one part water.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF AN EXEMPLARY EMBODIMENT OF THE INVENTION

The invention is directed to a method of manufacture and the resultant surface that is both primarily composed of aluminum and can be seasoned.

Aluminum, although commonly used as a substrate for cooking due to its superior properties which include excellent thermal conductivity, high specific heat, and light weight, by itself is very limited in its ability to resist abrasion and attack by acids. It, alone, is also not a suitable substrate for a seasoned coating as it does not typically retain the coating well due to a lack of porosity.

One methodology used to overcome some of the limitations is to hard anodize the aluminum. Through the hard anodizing process the aluminum develops a surface layer of high density aluminum oxide that is harder then steel which provides resistance to physical damage and is also highly resistant to attack by acids found in food preparation. Typically the final step in a hard anodized coating process is to seal the highly porous anodized surface through the use of hot water bath which causes a separate oxidation of aluminum with a somewhat different molecular shape to close the pores present in the anodized film. Sometimes a manufacturer will apply dyes and other chemicals to the porous surface to alter the properties of the final product.

A typical anodizing process starts with a complete work piece which has all machining, grinding or other mechanical shaping or forming processes completed. It is then cleaned in a de-greasing process, rinsed and submerged in the anodizing tank. In the anodizing tank, which is typically an acidified bath, electric current is passed through the work piece which acts as the anode in the electric circuit. As an anode the work piece will release oxygen ions which react with the aluminum substrate to produce an aluminum oxide film on the surface of the work piece. The process parameters can be varied widely to produce films with different characteristics. After the anodizing film is developed to the desired characteristics the work piece is rinsed and any post anodizing treatments such as dyes are applied. Then the work piece is sealed with one of three common processes.

Figure 1:
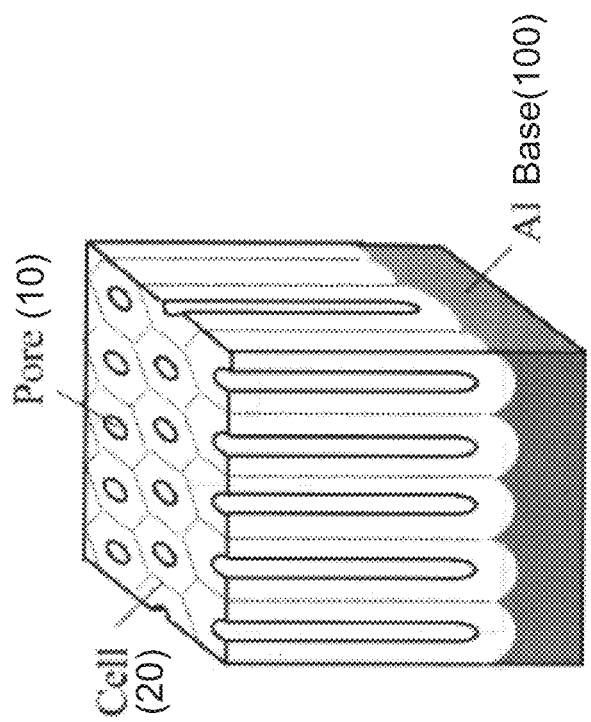
FIG. 1 illustrates a sectional view of an exemplary embodiment of the instant invention prior to applying a seasoning oil.

This invention relates to a previously unused technique, which is to stop the anodizing process before the porous anodized coating is sealed or treated in any manner. FIG. 1 illustrates a sectional view of an exemplary embodiment of the instant invention prior to applying a seasoning oil. At this time in an exemplary embodiment the anodizing process is complete and a porous substrate is left, cleaned with cool fresh water, and the pan is air dried. FIG. 1 shows the pores 10 and the substrate or oxidized layer 20 on the aluminum pan base 100. The pores must be in the substrate unsealed to receive the seasoning oil in the following step of the invention to result in the desired non-stick or stick resistant properties.

A seasoning oil, which can be but is certainly not limited to a drying oil with an iodine value greater than about 130 such as grape seed oil or flax seed oil, is then applied directly to the open pored substrate and is subsequently absorbed into the open pores. It is also possible to use other food safe oils which are known as semi-drying oils that have an iodine value of between about 115 and 130 such as, but certainly not limited to, corn, canola or sunflower oils, or non-drying oils which have an iodine value of about less then 115 such as, but certainly not limited to, olive or peanut oils, although these oils will not polymerize at room temperature and may require additional heated curing times to achieve full polymerization. On a structural level the pores remain substantially open prior to final processing and treatment. At this time, with the pores open before a last heating and treatment to lock in the initial oil application, the pan is baked at an elevated temperature, determined by the properties of the specific seasoning oil to polymerize the oil into a tough film. The polymerized oil 30 fills the pores 10 and the polymerized oil 30 creates a film that bonds with the substrate, filling the pores 10 of the substrate 20, as shown in more detail in FIG. 2.

Figure 2:
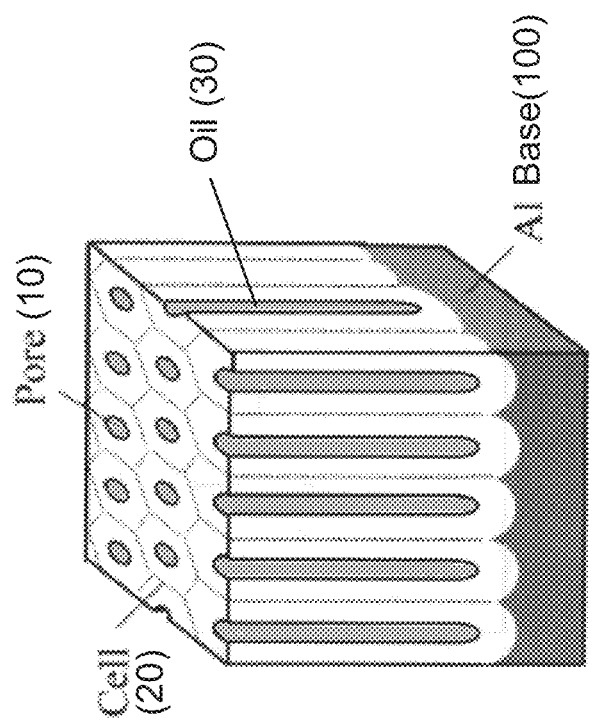
FIG. 2 is the cross-sectional view of FIG. 1 with the seasoning oil coating applied.

FIG. 2 is the cross-sectional view of FIG. 1 with the seasoning oil coating applied. The oil 30 is shown infiltrating and being retained in the pores 10 of substrate 20. The pore size is preferably sufficient to permit the infiltration of the oil but allow for adhesive forces to retain the oil and thereby securely bond to and coat the surface. The polymerized oil 30 film is effectively "locked in" to the pores by the expansion and final treatment of the pan. This is similar to paint treatments used to color existing pans. Once the polymerized oil 30 is in the pores 10 of the substrate 20 it is difficult to remove the base layer of oil. Even with significant mechanical agitation, the surface layer can become reduced, but the base layer of the film is retained and can only really be removed by destruction of the pores 10 within the substrate 20. As noted herein below, if the surface layer is abraded or disturbed through wear it can be restored simply with a further coat of polymerizing oil 30 that inherently bonds to the oil initially retained in the pores 10.

This process creates a base seasoning layer that becomes fully adhered to the anodized aluminum substrate and retained in the porous openings and has properties that far exceed those present in the seasoned films currently available on either cast or wrought iron or carbon steel. The process of the instant invention provides a stick resistant seasoned cooking surface with superior adhesion and uniformity on the porous anodized substrate 20. As noted, the seasoned oil is pulled into the pores by capillary action and becomes physically locked into the anodized layer or substrate. This primary exposure of the open pores of the anodized surface to a seasoning oil and subsequent heating creates a seed layer of polymerized oil which cannot be removed without destroying the substrate. The seasoned layer can then be further built up in terms of thickness for improved longevity and performance. These additional layers may be as part of a further seasoning step during manufacturing to provide pre-seasoned pans or may be completed by the end-user.

The advantages of this process and the resultant cooking surface are numerous. The seasoned surface provides all of the benefits to cooking performance in terms of exhibiting stick resistant properties but can be easily maintained by the end user by simply coating the pan with a layer of an appropriate oil and baking at the prescribed temperature to polymerize the oil. This renewable cooking surface will also allow manufacturers to produce better quality cookware because they will not "wear out" and be disposed of like traditional non-stick cookware. The non-stick or stick resistant properties also allow the surface to be renewable by the end user and provide the end user for an extended period of time and wear, making the value proposition that a quality piece of cookware with a longer life is being provided.

This process allows the superior properties of aluminum to be incorporated into a piece of cookware which can possess a seasoned coating. The pans can have far better thermal performance and will be much lighter. A polymerized seasoned surface is durable and stick resistant but, like any other surface treatment is also subject to wear from use. This wear can cause small voids or points of failure in the seasoned surface that can expose the pan substrate to potentially damaging elements like water or acids. These elements can attack the substrate and further accelerate the failure of the polymerized coating in the area of exposure in much the same way that a pin hole in the paint coating a steel substrate will allow rust to propagate underneath the still intact paint well beyond the hole itself. The rusting or oxidation process causes adhesion failure in the coating and exposes still more substrate material to attack. This type of failure is particularly noticeable in seasoned steel pans which have inferior adhesion when compared to a cast iron substrate. As a result, cooking with acidic foods and scrubbing with water and detergents, both of which may damage the seasoned layer, is not recommended for steel and cast iron pans. In addition, immediately drying after cleaning, reheating to insure a dry substrate and then re-oiling the pan to prevent environmental exposure during storage to air borne water molecules is also recommended for cast iron or steel seasoned cookware.

By contrast, a hard anodized aluminum substrate is, unlike iron or steel, impervious to acids and cannot rust. This characteristic means that there are no precautions or special cleaning requirements which must be considered when using a seasoned aluminum pan. An additional characteristic of such a surface is inherently increased durability because of the extremely uniform pores present in the surface before application of the seasoning oil. This decreases the likelihood of adhesion failure in any specific are of the pan. Further any voids or wear which may develop in the seasoned substrate through use or abuse of the pan will not compromise the base material as they will with iron or steel substrates as the hard anodized base in not susceptible to such damage and the polymerized oil is permeated into the surface. Thus the inventive process described yields a cooking substrate with all of the benefits of a seasoned cooking surface and all of the benefits of aluminum as a substrate.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method of forming an adhered layer of polymerized seasoning oil on a non-stick anodized aluminum or aluminum alloy pan such that the polymerized oil is retained within the porous substrate of the pan, comprising the steps of: anodizing an aluminum pan work piece to provide an open porous, unsealed anodized pan surface;
preparing the anodized pan surface to receive a polymerizing seasoning oil within the open pores of the open porous, unsealed anodized pan surface; and
applying a polymerizing seasoning oil to the anodized aluminum pan surface such that it penetrates the open pores of the open porous, unsealed anodized pan surface.

2. The method of claim 1, further comprising an at least one additional layer of seasoning oil and a further step of heating to polymerize the oil and bond the at least one additional layer of seasoning oil to the non-stick cooking surface.

3. The method of claim 1, wherein the open porous, unsealed anodized pan surface includes a substrate of aluminum oxide having a plurality of pores substantially uniformly distributed thereon and which draws the seasoning oil into the plurality of pores through a capillary action in the application step.

4. The method of claim 1, wherein the seasoning oil is a drying oil with an iodine value greater than 130.

5. The method of claim 1, wherein the seasoning oil is a semi-drying oil with an iodine value of between about 115 to 130.

6. The method of claim 1, wherein the seasoning oil is a non-drying oil with an iodine value less than 115.

7. The method of claim 1, wherein the seasoning oil is at least one of grape seed oil, flax seed oil, corn oil, canola oil, sunflower oil, olive oil and peanut oil.

8. The method of claim 1, further comprising the step of affixing a handle to the aluminum pan work piece.

9. The method of claim 1, further comprising the method step of sealing the anodized aluminum pan surface.

10. The method of claim 1, wherein the method step of preparing the anodized aluminum pan surface further comprises the method step of bathing the anodized aluminum pan surface in a liquid bath.

11. The method of claim 10, wherein the liquid bath further comprise a least one part water.

12. The method of claim 1, wherein said anodizing step further comprises a step of cleaning the pan in a de-greasing process, a step of rinsing the pan, and a step of submerging the pan in an anodizing tank.

13. The method of claim 12, wherein said anodizing step further comprises a step of passing electric current through the pan so as to produce an aluminum oxide film on the surface of the work piece to provide said open porous, unsealed pan surface.

14. The method of claim 13, further comprising a further rinsing step after the aluminum oxide film forming said open porous, unsealed pan surface is developed to the desired characteristics, whereby the work piece is rinsed and any post anodizing treatments are applied.

15. The method claim of 1, wherein the pores in said open porous, unsealed pan surface remain substantially open through the step of applying the polymerizing seasoning oil and permit penetration of the polymerizing seasoning oil into the pores of the open porous, unsealed surface and initially retain the polymerizing oil within the pores by surface adhesion.

16. The method step of 1, wherein the step of anodizing an aluminum pan surface to produce an open porous, unsealed anodized pan surface further comprises anodizing the pan so as to provide a pore size sufficient to permit the infiltration of the polymerizing seasoning oil but allow for surface adhesive forces to retain the oil within the pores and thereby securely bond the polymerizing seasoning oil into the pores and retain the oil in the pores in the heating step to polymerize the oil in the pores as a base layer for the nonstick cooking surface.

17. The method of claim 16, further comprising a pre-seasoning step, the pre-seasoning step including the addition of a further layer of a seasoning oil and heating of the further layer of seasoning oil to polymerize as an additional layer on top of the base layer of polymerizing oil retained within the pores, said additional film being applied atop the base layer retained in the pores and additionally forming the nonstick cooking surface.

18. The method of claim 1, further comprising heating the anodized aluminum pan surface so as to polymerize the seasoning oil and bond the polymerizing seasoning oil into the pores and retaining the seasoning oil therein to form a non-stick cooking surface.

* * * * *